United States Patent [19]
Helton et al.

[11] Patent Number: 5,450,996
[45] Date of Patent: Sep. 19, 1995

[54] SEAMER WITH IMPROVED BACK-UP ASSEMBLY

[75] Inventors: Norman R. Helton, Fenton, Mo.; Steven F. Joyce, Belleville, Ill.; Thomas L. Robinson, Robertsville, Mo.

[73] Assignee: Pandjiris, Inc., St. Louis, Mo.

[21] Appl. No.: 190,992

[22] Filed: Feb. 3, 1994

[51] Int. Cl.6 .............................. B23K 37/04
[52] U.S. Cl. ............................ 228/50; 219/160; 269/22; 269/43
[58] Field of Search ............ 228/50, 216; 219/160; 269/20, 310, 22, 43

[56] References Cited

U.S. PATENT DOCUMENTS

| 2,043,020 | 6/1936 | Thiemer | 228/50 |
| 2,522,659 | 9/1950 | Anderson | 269/22 |
| 2,941,491 | 6/1960 | Knost | 269/20 |
| 3,938,797 | 2/1976 | Frederick | 269/20 |

FOREIGN PATENT DOCUMENTS

| 66237 | 4/1969 | German Dem. Rep. | 219/160 |
| 43-6378 | 3/1968 | Japan | 219/160 |
| 45-23007 | 8/1970 | Japan | 228/50 |
| 61-266200 | 11/1986 | Japan | 228/50 |

Primary Examiner—Kurt Rowan
Assistant Examiner—Jeffrey T. Knapp
Attorney, Agent, or Firm—Cohn, Powell & Hind

[57] ABSTRACT

This seamer (10) with back-up assembly (50) includes a first table (30) supporting one of the workpieces W1, a second table (32) supporting the other of the workpieces W2, fingers (40, 42) clamping the workpieces to the table, and an improved back-up assembly (50) disposed between the first and second table (30, 32). The back-up assembly (50) includes an elongate back-up bar (52), a holder (54) carrying the back-up bar (52), a support (70) disposed in spaced relation from the holder (54), inflatable hoses (80, 82) operatively disposed between the holder (54) and the support (70), and a control system (88) inflating the hoses to adjust the elevation of the back-up bar (52) relative to the workpieces W1 and W2. The assembly (50) is slidingly removable as a unit to facilitate removal of the back-up bar (52).

15 Claims, 3 Drawing Sheets

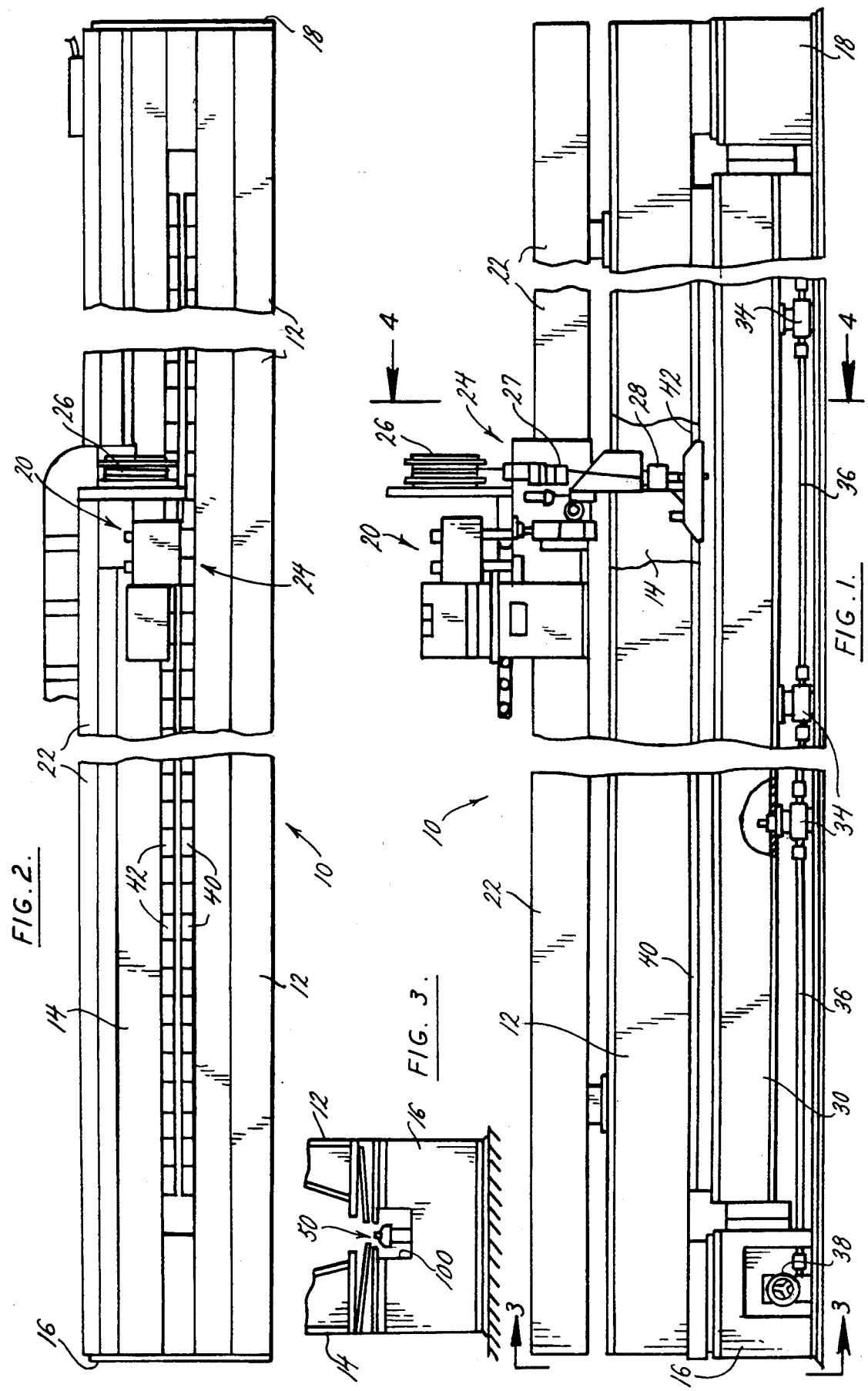

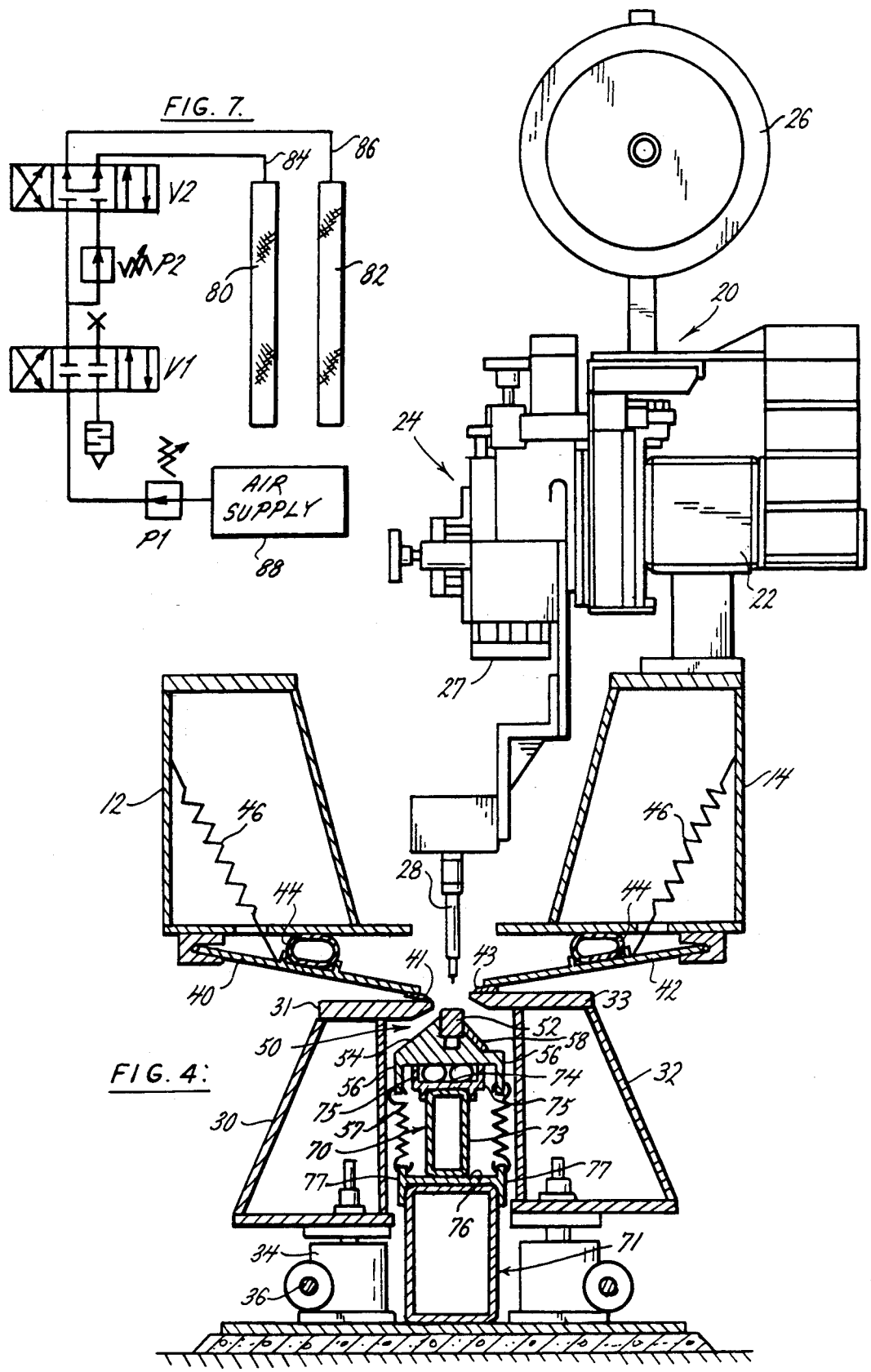

SEAMER WITH IMPROVED BACK-UP ASSEMBLY

BACKGROUND OF THE INVENTION

This invention relates generally to welding machines and more particularly to a seamer with improved back-up assembly for seam welding together workpiece plates of the same thickness or plates of different thickness and for facilitating removal and changing of back-up bars.

Welding techniques join workpiece plates by the application of heat and/or pressure, with or without the addition of a filler metal, and may be roughly divided into two classes, namely pressure welding and fusion welding. Seam welding is a process of closing a seam between two workpieces by a continuous resistance weld formed between two electrodes. The expansion and contraction of workpieces as they are heated by the welding must be allowed for, and jigs or clamps designed to hold the parts in correct alignment during welding.

It is well known and shown in U.S. Pat. No. 3,122,118 that a clamping device such as multiple paddles or fingers (usually aluminum) can be used to apply pressure continuously downward and a back-up bar lodged in a groove provided in the table of the seamer can be used to apply pressure continuously upward to hold the workpieces in correct alignment. By utilizing the back-up bar in conjunction with the clamping fingers, the tolerance after welding can normally be reduced since the table and the back-up bar provide a levelling means for the workpiece plates.

When two plates of equal thickness are welded together, the back-up bar is generally flat-sided with one side supporting the two workpieces in a level plane. In conventional welding operations, when the workpiece plates are of different thickness, the flat back-up bar supports the bottom of the two plates so that the plates are in a level plane on the underside and are uneven on the upperside where the plates are welded, resulting in a weaker and less accurate seam.

One problem with conventional back-up bar assemblies is that there is not effective surface contact between the back-up bar and workpiece plates providing continuous upward pressure responsive to the downward pressure of the clamping fingers, when the workpiece plates are of different thickness, and it is desired to seam the plates with the upperside in a level plane. The seamer operator is unable to adapt the back-up bar to each configuration of two workpieces of unequal thickness, especially when each welding operation consists of two workpieces of different thicknesses than the prior operation's two workpieces.

As shown in U.S. Pat. No. 3,122,118, the conventional back-up bar assembly consists of a slot formed in the top of the work table with the slot extending longitudinally from end to end of the table along the center longitudinal axis. Slidably interfitted in the slot is a back-up bar having a top surface that lies flush with the top surface of the work table and providing a welding zone extending endwise of the table. When a new back-up bar, a differently configured back-up bar or a back-up bar of a different material is desired, there is considerable down time and wasted man hours during the difficult and time consuming process of dislodging the old back-up bar from the seamer and replacing it with another.

There is no known prior art assembly that allows the back-up bar and holder to be quickly removed from the seamer and a new back-up bar and holder slid into the seamer so that the old back-up bar can be removed from the old holder while the new back-up bar and holder are being utilized in a seaming operation.

Prior art seamer and back-up bar assemblies require many man hours per unit, increased changeover time and additional work in the weld operation to weld workpiece plates of different thickness and to change back-up bars.

The present system seamer with improved back-up bar assembly overcomes these and other disadvantages in a manner not revealed in the known prior art.

SUMMARY OF THE INVENTION

This invention provides a seamer with back-up bar assembly which can be used to weld together workpiece plates of the same thickness or plates of different thickness and facilitates removal of the back-up bar assembly from the seamer.

This invention provides a seamer for welding two workpieces together having a back-up assembly, comprising a first table means supporting one of the workpieces, a second table means supporting the other of the workpieces, means clamping the workpieces to the table means, and a back-up assembly disposed between the first and second table means including a back-up bar means, support means and elevation adjustment means operatively disposed between the back-up bar means and the support means to adjust to elevation of the back-up bar means, and move the back-up bar means into engagement with the workpieces to facilitate welding of the workpieces together, and control means for the adjustment means.

It is an aspect of this invention to provide that the adjustment means includes inflatable means, and another aspect to provide that the inflatable means includes two inflatable hoses disposed in side-by-side relation.

It is another aspect of this invention to provide that the workpieces are of different thicknesses, and the control means selectively pressurizes the inflatable means to tilt the holder means whereby the back-up bar engages each of the workpieces.

It is yet another aspect of this invention to provide that the table means are differentially height adjustable.

It is still another aspect of this invention to provide that the control means includes means applying a differential pressure to two inflatable hoses.

It is another aspect of this invention to provide that the back-up assembly includes a holder means configurated to receive the back-up bar means and resilient means connecting the holder means to the support means.

It is still another aspect of this invention to provide that the holder means includes a generally tapered block being configurated at the upper end to receive the back-up bar means.

It is yet another aspect of this invention to provide that the holder means includes an ell-shaped notch having a groove at the corner and the back-up bar means includes a tongue received by the groove.

It is another aspect of this the holder ell-shaped notch receives the back-up bar means in removable relation and a keep plate engageable with said back-up bar means holds the back-up bar means in place.

It is still another aspect of this invention to provide that the back-up assembly is removeable from the seamer as a unit.

It is an aspect of this invention to provide that the seamer includes opposed end support bases, at least one being arranged to define an opening to facilitate removal of the back-up assembly.

It is yet another aspect of this invention to provide that the back-up bar means includes an upper surface having side portions each engageable with a respective workpiece, of different thickness and a common upper surface elevation, when the back-up bar means is tilted.

This invention assists the welder by providing a means whereby seamer welding can be done accurately and cost-efficiently with minimal manpower using semi-automatic or automatic equipment.

BRIEF DESCRIPTION OF THE DRAWINGS

FIG. 1 is an elevational view of the seamer;
FIG. 2 is a plan view thereof;
FIG. 3 is a fragmentary end view thereof;
FIG. 4 is an enlarged cross sectional view taken on line 4—4 of FIG. 1;
FIG. 7 is a schematic showing the pneumatic circuit diagram.

DESCRIPTION OF THE PREFERRED EMBODIMENT

Figure 5:
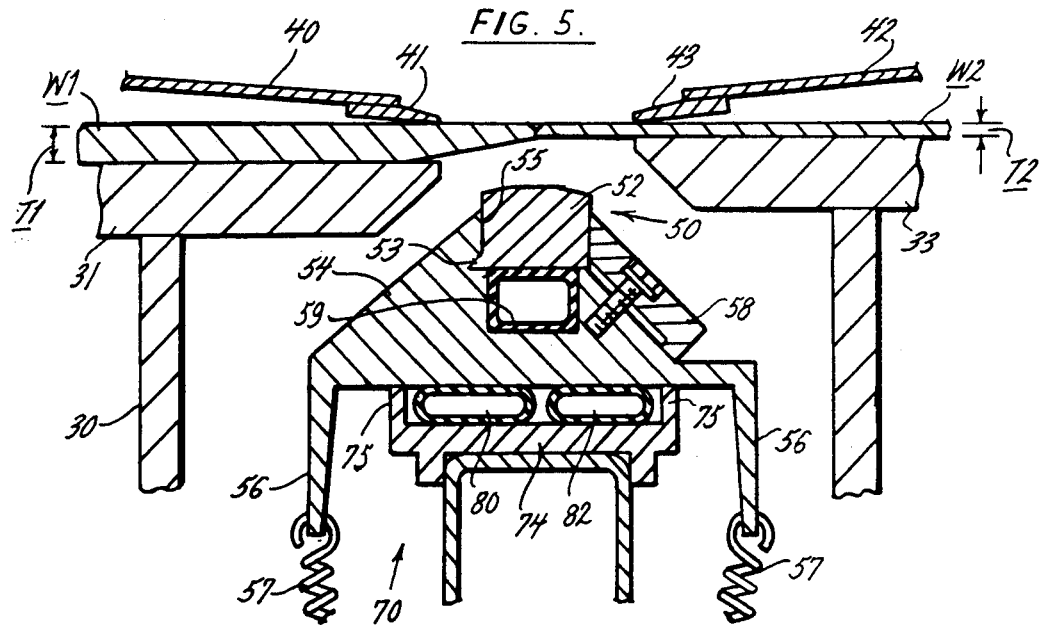
FIG. 5 is an enlarged cross sectional view of the back-up assembly in a lowered position.

Referring now by reference numerals to the drawings and first to FIGS. 1-4 it will be understood that the seamer 10 includes opposed elongate beams 12 and 14 supported between end base members 16 and 18. A carriage 20 rides longitudinally on a track 22 mounted to beam 14 and, as shown in FIG. 4, the carriage 20 transports a welding torch assembly, generally indicated by numeral 24, back and forth along the length of the track 22. The welding torch assembly 24 is conventional in that it includes a wire reel 26 and a wire drive 27 from which welding wire is fed to a welding torch 28 depending below the carriage 20. The welding torch assembly 24 is also conventional in that it includes horizontal and vertical slides, by which the location of the torch 28 is precisely controlled, oscillator and weld controls, and is supplied with power from a power source by way of a power track. The details of these components are well understood by those skilled in the art and do not require detailed description herein.

Figure 6:
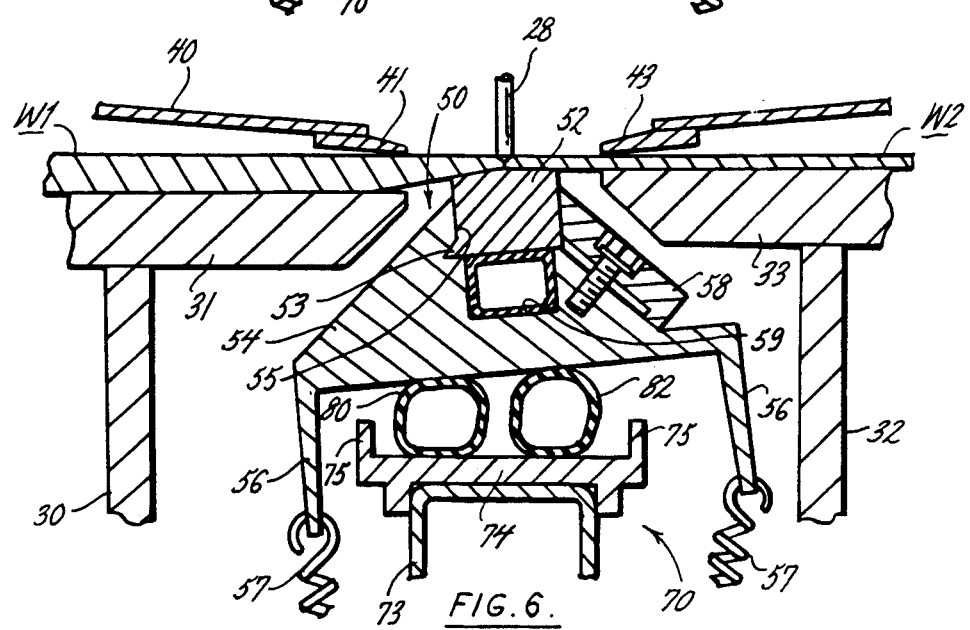
FIG. 6 is a similar view to FIG. 5 with the back-up assembly in a raised operational position.

As shown in FIG. 4-6, the welding torch assembly 24 is used in conjunction with a back-up assembly 50 to seam weld together workpieces W1 and W2, carried by height-adjustable elongate platen assemblies 30 and 32, as shown in FIGS. 5 and 6, and held in place by sectional clamp finger assemblies 40 and 42. In the embodiment shown, the platen assemblies 30 and 32 each includes a top member 31 and 33, tapered at the inner end, and each top member carries an associated workpiece plate W1 or W2 as shown in FIGS. 5 and 6. The clamp fingers assemblies 40 and 42 may include stainless remote end portions 41 and 43 bolted in place and engageable with an associated workpiece W1 or W2 seated on the associated platen top members 31 or 33 to clamp the associated workpieces firmly in position. Clamp finger assemblies 40 and 42 are pivoted at the outer end as shown in FIG. 4 and the clamping pressure at the remote ends is controlled by pneumatic hoses 44 and return springs 46.

The platen assemblies 30 and 32 constitute table means which are individually raised and lowered by a plurality of screwjacks 34 connected together by a rotating shaft 36 and controlled by a platen adjustment wheel 38, as shown in FIGS. 1 and 4.

The back-up assembly 50 may be used to seam weld together workpiece plates of the same thickness or plates of different thickness. As best shown in FIGS. 5 and 6, the back-up assembly 50 includes an elongate back-up bar 52, of suitable material such as copper, and an elongate holder 54, which is provided by a block having a generally triangular configuration. The holder 54, in the embodiment shown, is tapered on one side and is configurated to provide an ell-shaped notch 55, which receives the back-up bar 52. The holder 54 is grooved at the corner to receive an elongate tongue 53 and the holder also includes a removable keep plate 58 to facilitate removal of the back-up bar 52, said keep plate being held in place, as by bolts. The holder 54 may be recessed to receive a conduit 59, which provides a coolant passage running the entire length of the holder 54. The conduit 59 cooperates with front and rear hoses and a coolant tank (not shown) to provide a closed loop coolant system for the back-up bar 52.

In the embodiment shown, the holder 54 includes depending side members 56. As part of the back-up assembly a support means is provided for the holder 54 in the form of a sliding elongate member 70 carried by an elongate fixed pedestal 71. The composite sliding member 70 includes a rectangular member 73, an upper member 74 and a lower member 76. The upper member 74 includes side members 75 and provides a retainer for a pair of pneumatic hoses 80 and 82 disposed in side-by-side relation. The lower member 76 provides a guide member slidingly received by the fixed pedestal 71 and includes side members 77 which provide connection points for return springs 57 extending between the holder member 75 and the lower member 76.

The hoses 80 and 82 provide a means of raising the holder back-up assembly 50 in cooperation with the return springs 57. As shown in the circuit diagram FIG. 7, the hoses 80 and 82 include pneumatic supply hoses 84 and 86 at one end which are connected to an air supply 88. The hose inflation control means includes pressure regulators P1 and P2 and valves V1 and V2. This arrangement provides that hoses 80 and 82 can be supplied with differential air pressure determined by the pressure regulators P1 and P2 to facilitate the welding of two elongate workpieces W1 and W2 of different thicknesses T1 and T2 respectively. In the embodiment shown, the regulated pressure is 10 psi and 25 psi. When hose 80 is supplied with air at 10 psi and hose 82 is supplied with air at 25 psi the holder tilts to the left and the left side of the back-up bar moves into engagement with the thicker workpiece W1 while the right side of the back-up bar moves into engagement with the thinner workpiece W2 as shown in FIG. 8.

Figure 8:
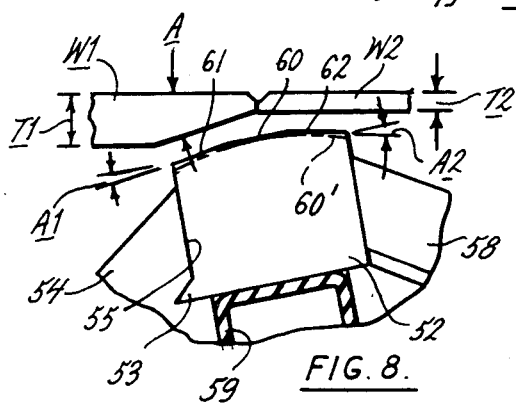
FIG. 8 is an enlarged fragmentary view showing the operation of the back-up bar.

As shown in FIG. 8, the top of the back-up bar 52 includes a center portion 60 and side portions 61 and 62. When the workpieces W1 and W2 are plates of equal thickness the air pressure supplied to the hoses 80 and 82 is equal and the center portion 60 engages both workpiece plates W1 and W2. When, however, the plates W1 and W2 are of different thicknesses the side portion 61 engages workpiece W1 and side portion 62 engages workpiece W2 with the center portion 60 bridging the two workpieces. It will be understood that ideally, the angle of the side portions 61 and 62 of the back-up bar 52 is one-half of the taper of the thicker plate W1. By this arrangement the clamping pressure is evenly distributed on the plates W1 and W2 that are engaged by the respective surfaces 61 and 62. Alternatively, the upper surface of the back-up bar 52 could be radiused, as shown in phantom outline by numeral 60' in FIG. 8, to achieve substantially the same effect but with point contact between the two sides of the bar 52 and the workpieces.

Figure 9:
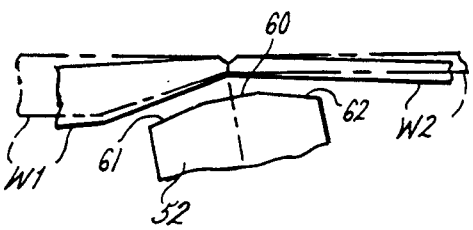
FIG. 9 is a similar view to FIG. 8 showing original and final operation positions of the workpieces.

In general, the platen assemblies 30 and 32 are raised by the screwjacks 34, with the workpieces W1 and W2 in place and the upper surface of the workpieces W1 and W2 and levelled by any conventional means. There is a tendency in seam welding operations for the heat applied to the seam to cause the plates subjected to the welding operation to move upwardly from the weld center outwardly. As shown schematically in FIG. 9 this can be counteracted by relaxing the pressure of the clamp fingers and exerting additional pressure on the back-up bar assembly so that a reverse orientation can be achieved in which the weld center is, relatively speaking, initially higher than the portions spaced outwardly away from the weld center. Accordingly, when the weld is applied the plate workpieces will be moved to a horizontal position.

When it is desired to remove the holder 54 to replace the back-up bar 52, it is required that sufficient clearance be provided at the end of the seamer 10 to pull the back-up assembly 50 including the back-up bar 52, the holder 54 and the sliding member 70 clear as a unit. This is facilitated by providing, as shown in FIG. 3, that the end base members 16 and 18 include a cut-out portion 100 to facilitate access to the sliding member 70. This arrangement provides that when the hoses 80 and 82 are deflated, as shown in FIG. 5, the undersurface of the holder 54 may rest on the upper retainer 74 of the sliding member 70 so that the back-up bar 52, holder 54 and sliding member 70 can be slid outwardly on the fixed pedestal 71 as a unit. Once the entire unit is pulled free the keep plate 58 can be removed and the back-up back 52 can be easily dislodged from the holder. A replacement back up bar 52, configured to suit the same or different workpiece thickness differentials can easily be inserted into the same holder 54 and the unit as a whole can be replaced. Alternatively, a new holder 54 with back-up bar 52 in place can be immediately installed to reduce down time.

Although the hoses 80 and 82 are described for a pneumatic system it will be understood that any fluid system, for example a hydraulic system, can be used in lieu of a pneumatic system.

In addition, although the improved seamer has been described by making particularized reference to a preferred holder assembly, the details of description is not to be understood as restrictive, numerous variants being possible within the principles disclosed and within the fair scope of the claims hereunto appended.

We claim as our invention:

1. A seamer for welding two workpieces together having a back-up assembly, comprising:
   a) a first table means supporting one of the workpieces,
   b) a second table means supporting the other of the workpieces,
   c) means clamping the workpieces to the table means,
   d) a back-up assembly disposed between the first and second table means including a back-up bar means, support means and elevation adjustment means operatively disposed between the back-up bar means and the support means to adjust the elevation of the back-up bar means and move the back-up bar means into engagement with the workpieces to facilitate welding of the workpieces together, and control means for the adjustment means, and
   e) the adjustment means including inflatable means selectively tilting the back up bar means into engagement with the workpieces.

2. A seamer as defined in claim 1, in which:
   f) the inflatable means includes two inflatable hoses disposed in side-by-side relation and selectively inflatable to facilitate alignment of the back-up bar means with the weld between the workpieces.

3. A seamer for welding two workpieces together having a back-up assembly, comprising:
   a) a first table means supporting one of the workpieces,
   b) a second table means supporting the other of the workpieces,
   c) means clamping the workpieces to the table means,
   d) a back-up assembly disposed between the first and second table means including a back-up bar means, support means and elevation adjustment means operatively disposed between the back-up bar means and the support means to adjust the elevation of the back-up bar means and move the back-up bar means into engagement with the workpieces to facilitate welding of the workpieces together, and control means for the adjustment means,
   e) the adjustment means including inflatable means,
   f) the workpieces being of different thicknesses, and
   g) the control means selectively pressurizing the inflatable means to tilt the back-up bar means whereby the back-up bar means engages each of the workpieces.

4. A seamer as defined in claim 3, in which:
   h) the table means are differentially height adjustable.

5. A seamer as defined in claim 3, in which:
   h) the inflatable means includes two inflatable hoses.

6. A seamer as defined in claim 5, in which:
   i) the control means includes means applying a differential pressure to the two inflatable hoses.

7. A seamer for welding two workpieces together having a back-up assembly, comprising:
   a) a first table means supporting one of the workpieces,
   b) a second table means supporting the other of the workpieces,
   c) means clamping the workpieces to the table means,
   d) a back-up assembly disposed between the first and second table means including a back-up bar means, support means and elevation adjustment means operatively disposed between the back-up bar means and the support means to adjust the elevation of the back-up bar means and move the back-up bar means into engagement with the workpieces to facilitate welding of the workpieces together, and control means for the adjustment means, and e) the back-up assembly including a holder means configured to receive the back-up bar means and resilient means connecting the holder means to the support means.

8. A seamer as defined in claim 7, in which:

f) the holder means includes a generally tapered block being configured at the upper end to receive the back-up bar means.

9. A seamer as defined in claim 8, in which:

g) the holder means includes an ell-shaped notch having a groove at the corner and the back-up bar means includes a tongue received by the groove.

10. A seamer as defined in claim 8, in which:

g) the holder includes an ell-shaped notch receiving the back-up bar means in removable relation and a keep plate engageable with said back-up bar means.

11. A seamer for welding two workpieces together having a back-up assembly, comprising:

a) a first table means supporting one of the workpieces, b) a second table means supporting the other of the workpieces, c) means clamping the workpieces to the table means, d) a back-up assembly disposed between the first and second table means including a back-up bar means, support means and elevation adjustment means operatively disposed between the back-up bar means and the support means to adjust the elevation of the back-up bar means and tiltingly move the back-up bar means into engagement with the workpieces to facilitate welding of the workpieces together, and control means for the adjustment means, and e) the workpieces being of different thicknesses, and f) the back-up bar means including an upper surface having side portions each engageable with a respective workpiece when the back-up bar means is tilted.

12. A seamer for welding two workpieces together having a back-up assembly, comprising:

a) a first table means supporting one of the workpieces, b) a second table means supporting the other of the workpieces, c) means clamping the workpieces to the table means, d) a back-up assembly disposed between the first and second table means including a back-up bar means, support means and elevation adjustment means operatively disposed between the back-up bar means and the support means to adjust the elevation of the back-up bar means and move the back-up bar means into engagement with the workpieces to facilitate welding of the workpieces together, and control means for the adjustment means, and e) the back-up assembly includes a holder means for the back-up bar means and at least the holder means and the back-up bar means are lengthwise removable from the seamer as a unit.

13. A seamer as defined in claim 12, in which:

f) the back-up assembly includes a lengthwise extending support means, and g) the seamer includes opposed end support bases, at least one being arranged to define an opening to facilitate lengthwise sliding removal of the back-up assembly support means.

14. A seamer as defined in claim 13, in which:

h) the adjustment means includes an inflatable means, and the holder means and the support means cooperate to provide a retainer for the inflatable means in the inflated and deflated conditions.

15. A seamer as defined in claim 14, in which:

i) the back-up assembly includes spring means extending between the holder means and the support means.

* * * * *